(12) United States Patent
Lee et al.

(10) Patent No.: US 8,067,332 B2
(45) Date of Patent: Nov. 29, 2011

(54) METHANATION CATALYST, AND CARBON MONOXIDE REMOVING SYSTEM, FUEL PROCESSOR, AND FUEL CELL INCLUDING THE SAME

(75) Inventors: Hyun-chul Lee, Yongin-si (KR); Soon-ho Kim, Seoul (KR); Kang-hee Lee, Yongin-si (KR); Doo-hwan Lee, Suwon-si (KR); Eun-duck Park, Suwon-si (KR); Eun-yong Ko, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 567 days.

(21) Appl. No.: 11/743,763

(22) Filed: May 3, 2007

(65) Prior Publication Data

US 2007/0259975 A1    Nov. 8, 2007

(30) Foreign Application Priority Data

May 3, 2006    (KR) .................. 10-2006-0040084
Oct. 25, 2006  (KR) .................. 10-2006-0104043

(51) Int. Cl.
*B01J 23/00*    (2006.01)
*B01J 23/40*    (2006.01)
*B01J 23/42*    (2006.01)
*B01J 23/44*    (2006.01)
*H01M 8/00*    (2006.01)
*H01M 4/02*    (2006.01)
*H01M 4/36*    (2006.01)
*H01M 4/92*    (2006.01)

(52) U.S. Cl. ........ 502/326; 502/302; 502/327; 502/334; 502/335; 502/337; 502/339; 502/349; 429/400; 429/524; 429/527

(58) Field of Classification Search .................. 502/302, 502/326, 327, 334, 337, 339, 349, 335; 429/400, 429/524, 527
See application file for complete search history.

(56) References Cited

U.S. PATENT DOCUMENTS 3,167,457 A * 1/1965 Bacon et al. .................. 502/101
(Continued)

FOREIGN PATENT DOCUMENTS

EP    1 630 130 A1    3/2006
(Continued)

OTHER PUBLICATIONS

KIPO Notice of Allowance dated Jun. 28, 2007, for Korean priority Patent application 10-2006-0104043, 4 pages.

(Continued)

*Primary Examiner* — Cam N. Nguyen
(74) *Attorney, Agent, or Firm* — Christie, Parker & Hale, LLP (57) ABSTRACT

A methanation catalyst, a carbon monoxide removing system, a fuel processor, and a fuel cell including the same, and more particularly a non-supported methanation catalyst including the catalytically active non-precious metal particles and the metal oxide particles, and a carbon monoxide removing system, a fuel processor, and a fuel cell including the same. The methanation catalyst has high selectivity for the methanation of carbon monoxide instead of the methanation of carbon dioxide and the reverse water gas shift reaction of carbon dioxide, which are side reactions of the methanation of carbon monoxide, maintains high concentration of generated hydrogen as small amounts of hydrogen and carbon dioxide are consumed, and effectively removes carbon monoxide at low operating temperatures of 200° C. or less.

33 Claims, 10 Drawing Sheets

U.S. PATENT DOCUMENTS

| | | | | |
|---|---|---|---|---|
| 3,235,515 | A * | 2/1966 | Taylor | 502/337 |
| 3,272,867 | A * | 9/1966 | Conner et al. | 564/492 |
| 3,424,808 | A * | 1/1969 | Moe et al. | 585/445 |
| 3,441,390 | A * | 4/1969 | Wiskow et al. | 428/553 |
| 3,476,536 | A * | 11/1969 | Milliken et al. | 48/214 A |
| 3,549,556 | A * | 12/1970 | Dienes | 502/250 |
| 3,928,002 | A * | 12/1975 | Morikawa et al. | 502/328 |
| 3,988,262 | A * | 10/1976 | Andersen et al. | 502/335 |
| 4,026,823 | A * | 5/1977 | Van Hook et al. | 502/337 |
| 4,042,532 | A * | 8/1977 | McArthur | 502/335 |
| 4,064,152 | A * | 12/1977 | McArthur | 518/715 |
| 4,171,288 | A * | 10/1979 | Keith et al. | 502/304 |
| 4,191,664 | A * | 3/1980 | McArthur | 502/335 |
| 4,297,333 | A * | 10/1981 | Crawford et al. | 423/241 |
| 4,312,791 | A * | 1/1982 | Antos | 502/327 |
| 4,460,704 | A * | 7/1984 | Twigg | 502/302 |
| 4,510,264 | A * | 4/1985 | Matsuoka et al. | 502/328 |
| 4,758,546 | A * | 7/1988 | Baer et al. | 502/337 |
| 4,992,408 | A * | 2/1991 | Jackson | 502/328 |
| 5,053,379 | A * | 10/1991 | Giordano et al. | 502/328 |
| 5,320,998 | A * | 6/1994 | Horiuchi | 502/245 |
| 5,352,835 | A * | 10/1994 | Dai et al. | 564/480 |
| 5,403,806 | A * | 4/1995 | Simpson | 502/211 |
| 5,686,375 | A * | 11/1997 | Iyer et al. | 502/315 |
| 5,744,419 | A * | 4/1998 | Choudhary et al. | 502/326 |
| 5,958,825 | A * | 9/1999 | Wulff-Doring et al. | 502/300 |
| 6,043,187 | A * | 3/2000 | Harle et al. | 502/313 |
| 6,096,934 | A | 8/2000 | Rekoske | |
| 6,113,871 | A * | 9/2000 | Schafer et al. | 423/239.1 |
| 6,200,927 | B1 * | 3/2001 | Shukis et al. | 502/355 |
| 6,261,465 | B1 * | 7/2001 | Hancock | 210/763 |
| 6,398,950 | B1 * | 6/2002 | Iwamoto et al. | 208/216 R |
| 6,585,944 | B1 * | 7/2003 | Nunan et al. | 423/239.1 |
| 6,602,821 | B2 * | 8/2003 | Petit-Clair et al. | 502/306 |
| 6,673,743 | B2 * | 1/2004 | Lok | 502/337 |
| 6,806,226 | B2 * | 10/2004 | Van Berge et al. | 502/326 |
| 6,818,589 | B1 * | 11/2004 | Gillespie | 502/326 |
| 6,835,690 | B2 * | 12/2004 | Van Berge et al. | 502/328 |
| 6,841,512 | B1 * | 1/2005 | Fetcenko et al. | 502/335 |
| 6,852,666 | B1 * | 2/2005 | Bouly et al. | 502/304 |
| 6,930,073 | B2 * | 8/2005 | Dou | 502/328 |
| 6,933,259 | B2 * | 8/2005 | Hatanaka et al. | 502/240 |
| 7,005,405 | B2 * | 2/2006 | Suenaga et al. | 502/439 |
| 7,179,442 | B2 * | 2/2007 | Hagemeyer et al. | 423/655 |
| 7,196,036 | B2 * | 3/2007 | Kobayashi et al. | 502/335 |
| 7,371,358 | B2 * | 5/2008 | Upchurch et al. | 423/213.5 |
| 7,399,728 | B2 * | 7/2008 | LaBarge | 502/325 |
| 7,405,178 | B2 * | 7/2008 | Li et al. | 502/325 |
| 7,408,086 | B2 * | 8/2008 | Vanoppen et al. | 564/422 |
| 7,498,289 | B2 * | 3/2009 | Liu | 502/335 |
| 7,531,479 | B2 * | 5/2009 | Burns et al. | 502/302 |
| 7,547,656 | B2 * | 6/2009 | Miura | 502/327 |
| 7,824,656 | B2 * | 11/2010 | Idem et al. | 423/651 |
| 2002/0183200 | A1 * | 12/2002 | Sato et al. | 502/325 |
| 2003/0050523 | A1 * | 3/2003 | Gillespie et al. | 585/734 |
| 2004/0048114 | A1 | 3/2004 | Shore | |
| 2006/0194694 | A1 * | 8/2006 | Hagemeyer et al. | 502/302 |
| 2006/0198782 | A1 * | 9/2006 | Cai et al. | 423/653 |
| 2006/0216227 | A1 * | 9/2006 | Idem et al. | 423/651 |
| 2007/0197378 | A1 * | 8/2007 | Liu | 502/302 |
| 2009/0215613 | A1 * | 8/2009 | Hagemeyer | 502/304 |

FOREIGN PATENT DOCUMENTS

JP  2000-254508  9/2000

OTHER PUBLICATIONS

Patent Abstracts of Japan, and English machine translation of Japanese Publication 2000-254508, 44 pages.

* cited by examiner

METHANATION CATALYST, AND CARBON MONOXIDE REMOVING SYSTEM, FUEL PROCESSOR, AND FUEL CELL INCLUDING THE SAME

CROSS-REFERENCE TO RELATED PATENT APPLICATIONS

This application claims the benefit of Korean Patent Application No. 2006-40084, filed May 3, 2006, and Korean Patent Application No. 2006-104043, filed Oct. 25, 2006, in the Korean Intellectual Property Office, the disclosure of which is incorporated herein by reference.

BACKGROUND OF THE INVENTION

1. Field of the Invention

Aspects of the present invention relate to a methanation catalyst, and a carbon monoxide removing system, a fuel processor, and a fuel cell including the same, and more particularly, to a methanation catalyst having high selectivity for a methanation of carbon monoxide rather than a reverse water gas shift reaction of carbon dioxide, which is a side reaction of the methanation, maintains high concentration of generated hydrogen, and effectively remove carbon monoxide at a low operating temperature of 200° C. or less, and a carbon monoxide removing system, a fuel processor, and a fuel cell including the same.

2. Description of the Related Art

Fuel cells are electricity generation systems that directly convert the chemical energy of hydrogen from hydrocarbons, such as methanol, ethanol and natural gas, and the chemical energy of oxygen to electrical energy.

Figure 1:
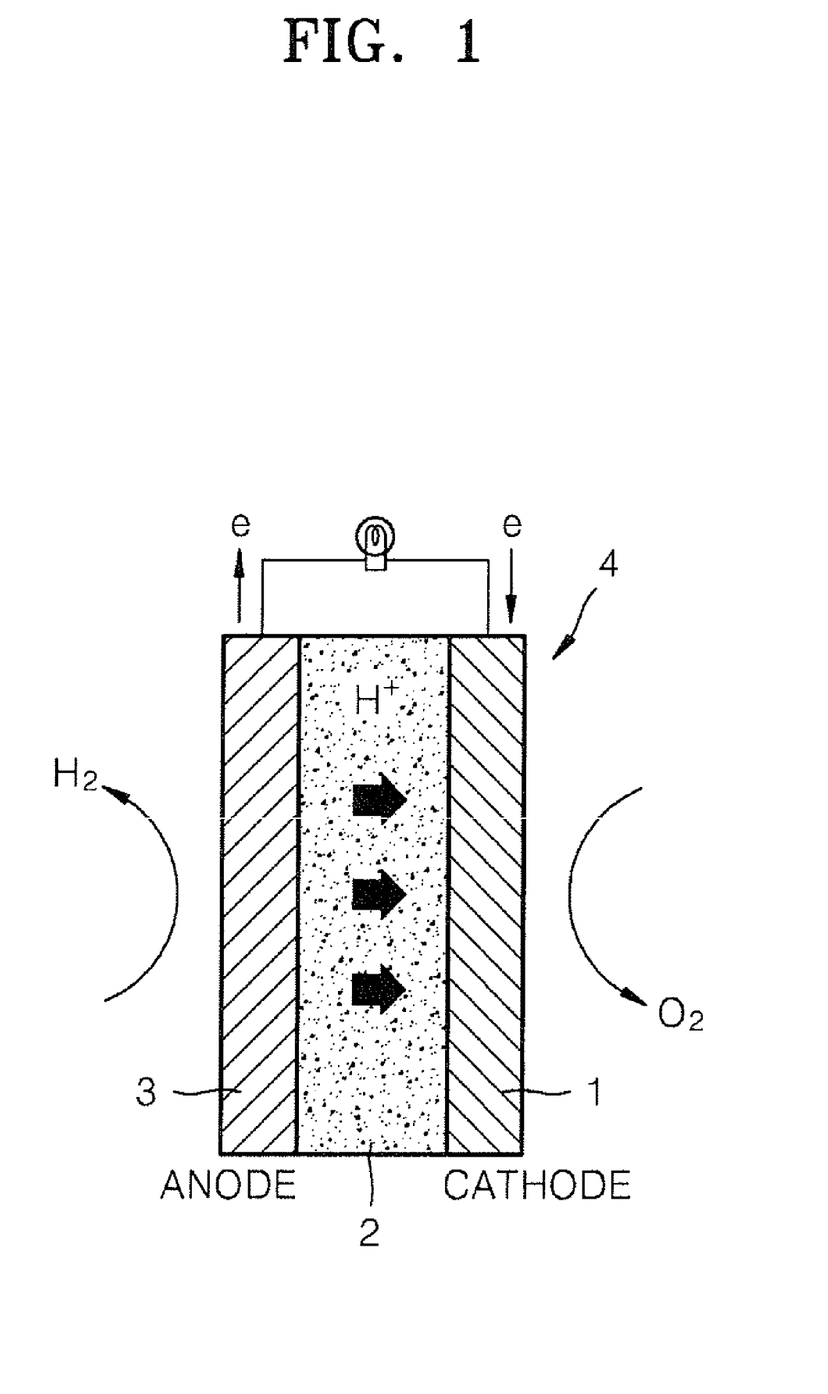
FIG. 1 is a schematic diagram illustrating an energy conversion process to produce electricity in a fuel cell.

FIG. 1 is a schematic diagram illustrating an energy conversion process to produce electricity in a fuel cell 4. As illustrated in FIG. 1, air that includes oxygen is supplied to a cathode 1 and a fuel containing hydrogen is supplied to an anode 3, electricity is generated as an electrolyte membrane 2 allows hydrogen ions to flow from the anode 3 to the cathode 1 through the electrolyte membrane 2 while electrons e are forced to flow through a circuit, which produces usable energy. The hydrogen and oxygen combine at the cathode 1 to produce water.

Figure 2:
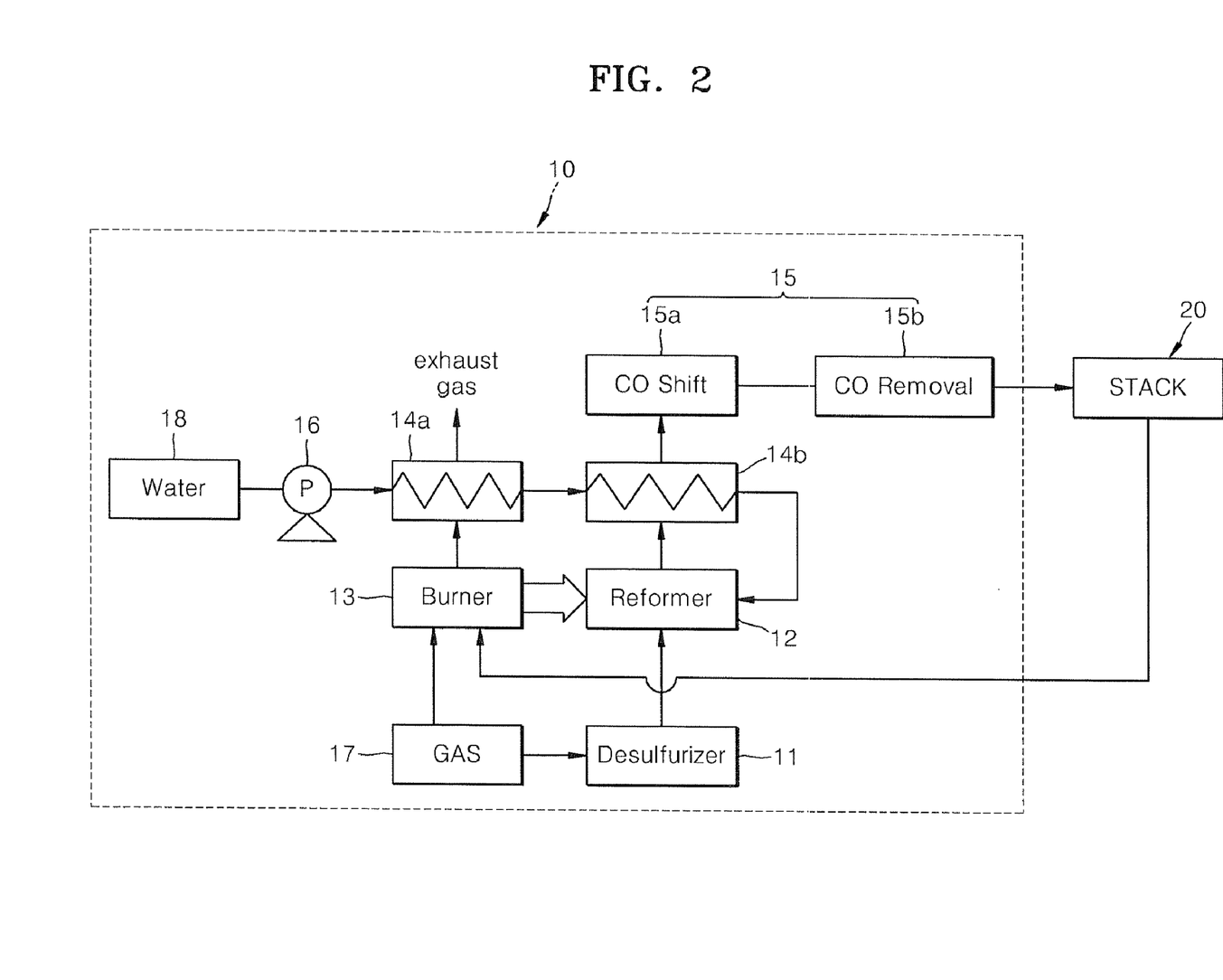
FIG. 2 is a schematic diagram illustrating a fuel processor treating fuel to be supplied to a fuel cell.

Fuel cell systems consist of a fuel cell stack, a fuel processor (FP), a fuel tank, a fuel pump, etc. The fuel cell stack is a main body of a fuel cell, and includes several to several tens of unit cells each including a membrane electrode assembly (MEA) and a separator (or bipolar plate). With reference to FIG. 2, hydrogen is extracted from the fuel in a fuel processor 10 so as to be supplied to the fuel cell stack 20. The fuel processor 10 includes a desulfurizer 11, a reformer 12, a burner 13, a water supply pump 16, first and second heat exchangers 14a and 14b, and a CO removal unit 15 comprising a CO shift reaction device 15a and a CO removal device 15b. The hydrogen is extracted in a reformer 12 of the fuel processor 10.

The fuel pump supplies the fuel in the fuel tank to the fuel processor. The fuel processor 10 produces hydrogen by reforming and purifying the fuel and supplies the hydrogen to the fuel cell stack 20. The fuel cell stack 20 receives the hydrogen and generates electrical energy through electrochemical reactions of the hydrogen with oxygen.

The reformer 12 of the fuel processor 10 reforms a hydrocarbon fuel using a reforming catalyst. The hydrocarbon fuel contains a sulfur compound, which easily poisons the reforming catalyst. As such, it is necessary to remove the sulfur compound prior to reforming the hydrocarbon fuel. Thus, the hydrocarbon fuel needs to be desulfurized prior to the reforming process.

In addition to hydrogen, hydrocarbon reforming produces carbon dioxide and a small amount of carbon monoxide as by-products. Since CO poisons catalyst materials in electrodes of the fuel cell stack, reformed fuel cannot be directly supplied to the fuel cell stack. Thus, a CO removal process is needed. It is preferable to reduce the CO levels to less than 10 ppm.

CO can be removed using a high and low temperature shift reaction represented by Reaction Scheme 1 below.

Reaction Scheme 1

$$CO + H_2O \longrightarrow CO_2 + H_2$$

A high-temperature shift reaction is performed at a temperature of 400 to 500° C. Generally, a high-temperature shift reaction is followed by a low-temperature shift reaction at a temperature of 200 to 300° C. Even though these reactions are performed, it is very difficult to reduce the CO levels to less than 5,000 ppm.

To solve this problem, a preferential oxidation (PROX) reaction represented by Reaction Scheme 2 below can be used.

Reaction Scheme 2

$$CO + \tfrac{1}{2}O_2 \longrightarrow CO_2$$

Air is additionally supplied since the PROX reaction needs an excessive amount of oxygen. However, the concentration of hydrogen to be supplied to the fuel cell is decreased by the PROX reaction as carbon dioxide is generated.

Thus, a methanation reaction as shown in Reaction Scheme 3 is used to remove carbon monoxide and to overcome disadvantages of the PROX reaction.

Reaction Scheme 3

$$CO + 3H_2 \longrightarrow CH_4 + H_2O$$

Platinum, which is a precious metal, has been widely used in the PROX reaction, and ruthenium, which is also a precious metal, and cobalt and nickel loaded on an alumina support, which are non-precious metals, have been widely used in the methanation as catalysts.

The conventional methanation catalyst has high activity in the methanation of carbon monoxide as well as the methanation of carbon dioxide and the reverse water gas shift reaction, which are side reactions of the methanation of carbon monoxide and are shown below.

Reaction Scheme 4

$$CO_2 + 4H_2 \longrightarrow CH_4 + 2H_2O$$

Reaction Scheme 5

The side reactions consume hydrogen supplied to the fuel cell stack. Accordingly, it is necessary to develop a cost effective methanation catalyst that is simple to manufacture. Further, the methanation catalyst should be formed of a non-precious metal catalyst that does not require a support and that maintains high concentration of generated hydrogen as only small amounts of hydrogen and carbon dioxide are consumed in the reactions and has a high selectivity for the methanation of carbon monoxide rather than the methanation of carbon dioxide and the reverse water gas shift reaction of carbon dioxide.

Meanwhile, in a fuel processing system employing the PROX catalyst and the methanation catalyst, the operating temperature of the PROX catalyst is in the range of 100 to 200° C. and the operating temperature of the conventional methanation catalyst is in the range of 220 to 300° C. Thus, it is difficult to set an appropriate operating temperature range when the two catalysts are used together, and separate reactors are needed for the PROX reaction and the methanation reaction.

SUMMARY OF THE INVENTION

Aspects of the present invention provide a methanation catalyst with high selectivity for a methanation of carbon monoxide rather than a reverse water gas shift reaction of carbon dioxide which is a side reaction and a methanation of carbon dioxide, to maintain a high concentration of generated hydrogen as only small amounts of hydrogen and carbon dioxide are consumed, and effectively remove carbon monoxide at low operating temperatures of 200° C. or less to thus effectively remove carbon monoxide in a single reactor including a PROX catalyst, a carbon monoxide removing system, a fuel processor, and a fuel cell including the same.

According to an aspect of the present invention, there is provided a non-supported methanation catalyst including catalytically active, non-precious metal particles and metal oxide particles.

According to another aspect of the present invention, there is provided a carbon monoxide removing catalyst system comprising the non-supported methanation catalyst including the catalytically active, non-precious metal particles and the metal oxide particles.

According to another aspect of the present invention, there is provided a fuel processor comprising a desulfurizer, a reformer, a shift reaction device, and a carbon monoxide removal unit including the carbon monoxide removing catalyst system.

According to another aspect of the present invention, there is provided a fuel cell including the fuel processor.

The non-supported methanation catalyst of the present invention has high selectivity for a methanation of carbon monoxide rather than both a reverse water gas shift reaction of carbon dioxide which is a side reaction of the methanation and a methanation of carbon dioxide, maintains high concentration of generated hydrogen as small amounts of hydrogen and carbon dioxide are consumed, and effectively removes carbon monoxide at low operating temperatures of 200° C. or less, and thus effectively removes carbon monoxide in a single reactor including a PROX catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to aspects of the present invention, a non-supported methanation catalyst including catalytically active, non-precious metal particles and metal oxide particles is provided.

According to aspects of the current invention, catalytically active, non-precious metal particles used in a methanation reaction consume less $H_2$ and $CO_2$ than conventional supported catalysts and effectively remove CO at a low operating temperature. The catalytically active non-precious metal particles may be cobalt (Co), nickel (Ni), or a mixture thereof. Further, the metal oxide may be $CoO_x$ or $NiO_x$, where x is a number of from 1 to 2.

Meanwhile, the mol ratio of the metal oxide particles to the metal particles may be in the range of 0 to 1, inclusive, and preferably in the range of 0 to 0.4, inclusive. The mol ratio between the metal oxide particles and the metal particles may be regulated by adjusting post-treatment conditions. For example, a heat treatment may be performed under a hydrogen atmosphere at a temperature in the range of 200 to 500° C. for 1 to 12 hours to regulate the mol ratio of the metal oxide particles to the metal particles.

Further, when a mixture of cobalt and nickel is used for the catalytically active, non-precious metal particles, the amount of nickel and a nickel oxide may be in the range of 10 to 90 parts by weight based on 100 parts by weight of cobalt and a cobalt oxide.

The methanation catalyst according to aspects of the present invention may be cost-effectively manufactured using inexpensive non-precious metal and a metal oxide thereof. The methanation catalyst may be such non-precious metals as cobalt and nickel. A conventional methanation catalyst was generally prepared by loading the non-precious metal catalyst on a support. However, in the methanation catalyst preparation process according to aspects of the present invention, post-treatment conditions can be adjusted to regulate the ratio of the metal oxide particles and the metal particles without using the support. As a result, the metal oxide particles act as the support, and the methanation catalyst may more effectively remove carbon monoxide compared to the conventional supported catalysts.

Figure 4:
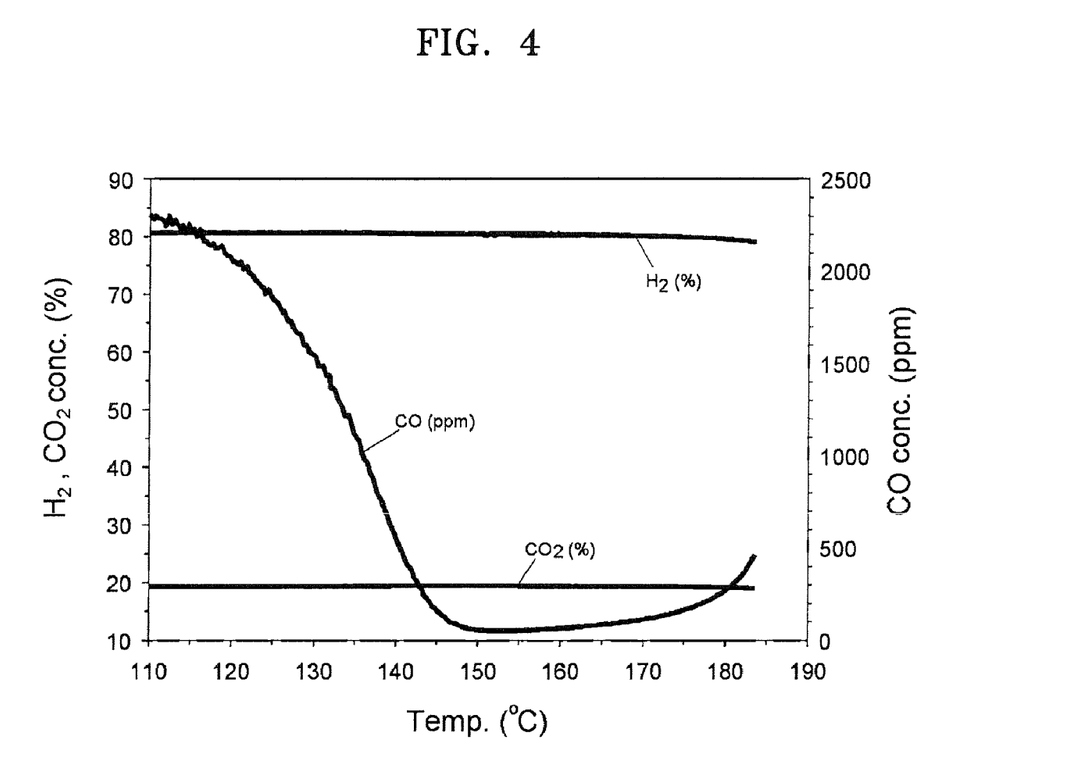
FIG. 4 is a graph illustrating the concentrations of $H_2$, $CO_2$ and CO according to the temperature when a catalyst consisting of cobalt particles and a cobalt oxide is used for the non-supported methanation catalyst according to aspects of the present invention.

FIG. 4 is a graph illustrating the concentrations of $H_2$, $CO_2$ and CO according to the temperature when a catalyst consisting of cobalt particles and a cobalt oxide is used for the non-supported methanation catalyst. The initial concentrations of reactant gases of CO, $H_2$, and $CO_2$, exclusive of water are respectively 0.2%, 80%, and 19.8%, and the amount of water supplied at GHSV 6,000 ml/g/h is 20% based on the total amount of the reactants. The initial 0.2% concentration of CO is equivalent to about 2400 ppm of CO.

Referring to FIG. 4, the methanation catalyst comprising cobalt particles and cobalt oxide particles can reduce the concentration of carbon monoxide at carbon monoxide concentrations of 1% or less at an operating temperature in the range of 140 to 180° C., which is much less than the operating temperature range of conventional methanation catalysts which operate at 200 to 240° C. However, the concentrations of hydrogen and carbon dioxide remained generally constant. Thus, carbon monoxide can be selectively removed through the methanation which decreases the activity of the reverse water gas shift reaction of carbon dioxide and hydrogen as such reaction occurs at a high operating temperature. The methanation reaction according to aspects of the current invention occurs at a low temperature and thus does not consume hydrogen required for the operation of the fuel cell.

The non-precious metal active catalyst may have an average particle size of 2 to 500 nm. When the average particle size is less than 2 nm, preparation of the catalyst is difficult and the catalyst is not sufficiently active as the particle size is too small. On the other hand, when the average particle size is greater than 500 nm, the catalyst particles aggregate and the catalyst activity decreases.

The methanation catalyst according to the current embodiment may be a non-supported metal catalyst which is not loaded on conventional supports such as alumina ($Al_2O_3$), $TiO_2$, $ZrO_2$, and $CeO_2$. The methanation catalyst may be prepared according to a method of preparing a catalyst for reforming fuels generally used for fuel cells. Thus, the methanation catalyst may be prepared by a method commonly used in catalyst preparations, such as precipitation, hydrothermal synthesis, and a sol-gel method, but the preparation method is not limited thereto. The prepared catalyst may be reduced by a commonly used reduction method, such as a vapor phase reduction and a liquid phase reduction. In the catalyst preparation process, post-treatment conditions can be adjusted to regulate the ratio of the metal oxide particles and the catalytically active, non-precious metal particles.

According to aspects of the current invention, an active catalyst metal precursor is dissolved in a dispersion medium, such as water and an alcohol-based solvent, and the resultant precursor solution is adjusted to a pH of 8 to 9 by dropwise addition of 1 M NaOH. Then, the mixture was ripened at a temperature in the range of 70 to 80° C. for 1 hour, and the ripened mixture was filtered and washed using deionized water to reach a pH of 7. Then, the mixture is dried in an oven, sintered, and reduced to prepare crystalline active catalyst metal particles and the metal oxide particles. The alcohol-based solvent may be methanol, ethanol, isopropyl alcohol, butyl alcohol, etc., but is not limited thereto. The drying may be performed at a temperature in the range of 80 to 120° C. for 6 to 24 hours, and the sintering may be performed at a temperature in the range of 200 to 500° C. for 1 to 24 hours. Further, the reduction may be performed at a temperature in the range of 200 to 500° C. for 1 to 12 hours. The reduction may be performed under an $H_2$ atmosphere, and the $H_2$ atmosphere may further optionally include an inert gas such as helium, nitrogen, and neon.

According to aspects of the present invention, a carbon monoxide removing catalyst system including a non-supported methanation catalyst is prepared. The carbon monoxide removing catalyst system may further include a PROX catalyst in addition to the non-supported methanation catalyst.

Any conventional catalyst that has sufficient activity for selectively oxidizing carbon monoxide may be used for the PROX catalyst without limitation in the carbon monoxide removing catalyst system. For example, one or more metals selected from the group consisting of platinum, ruthenium, palladium, rhodium, gold, copper, nickel, and cobalt may be loaded on a support and used for the PROX catalyst. The support may be one or more compounds selected from the group consisting of alumina, zirconia, stabilized zirconia, iron oxide, zinc oxide, titanium oxide, cobalt oxide, zeolite, silicon oxide, tin oxide, magnesium hydroxide, and cesium oxide, and preferably $CuO$—$CeO_2$, Pt—Ni/$\gamma$-$Al_2O_3$, Pt—Co/$\gamma$-$Al_2O_3$, and Pt—Co/YSZ.

Since the PROX catalyst and the methanation catalyst according to aspects of the current invention have similar range of the operating temperatures, the constitution of the carbon monoxide removing catalyst system may be simplified. That is, the PROX catalyst and the methanation catalyst can be integrated and charged in the same CO removal unit of the carbon monoxide removing catalyst system, which is distinguished from the conventional carbon monoxide removing catalyst system.

The volume of the PROX catalyst in the carbon monoxide removing catalyst system according to aspects of the current invention may be in the range of 5 to 50% by volume. When the amount of the PROX catalyst is less than 5% by volume, the initial efficiency of removing carbon monoxide is too low and thus the carbon monoxide may not be sufficiently removed in the following methanation. When the amount of the PROX catalyst is greater than 50% by volume, the use of precious metal as the active catalyst may increase the manufacturing costs.

The carbon monoxide removing catalyst system according to aspects of the current invention may effectively remove carbon monoxide at an operating temperature less than 200° C., preferably in the range of 25 to 200° C., and more preferably in the range of 100 to 180° C.

Figure 3:
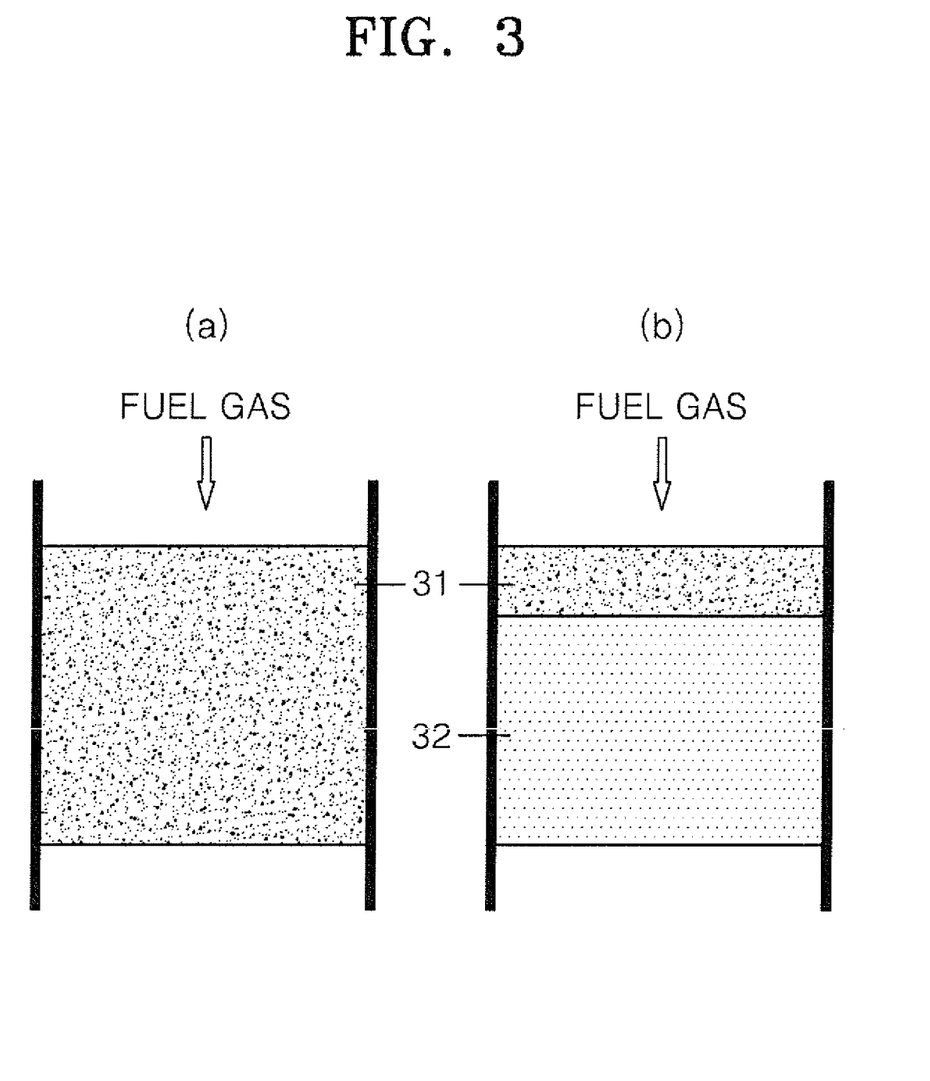
FIG. 3 is schematic cross-sectional views of a CO removal unit including only a conventional PROX catalyst and a CO removal unit including a carbon monoxide removing catalyst system according to aspects of the present invention.

FIG. 3 is schematic sectional views of a CO removal unit (a) including only a conventional PROX catalyst and a CO removal unit (b) including a carbon monoxide removing catalyst system according to aspects of the present invention. As illustrated in FIG. 3, the carbon monoxide removing catalyst system includes a PROX catalyst 31 disposed close to a fuel inlet of the CO removal unit so that an un-enriched hydrogen fuel flows first through the PROX catalyst 31, and a methanation catalyst 32 disposed close to a fuel outlet of the CO removal unit so as to produce an enriched hydrogen fuel. The PROX catalyst may be in contact with the methanation catalyst or separated from the methanation catalyst when the PROX and methanation catalysts are charged in the carbon monoxide removing catalyst system.

According to aspects of the present invention, a fuel processor including the carbon monoxide removing catalyst system is prepared. The fuel processor will be herein described.

The fuel processor may include a desulfurizer, a reformer, a carbon monoxide shift reaction device having a high-temperature shift reaction device and a low-temperature shift reaction device, and a carbon monoxide removal unit having a carbon monoxide removing catalyst system according to aspects of the present invention and similar to as described above with regard to FIG. 2.

The desulfurizer removes sulfur compounds which poison a catalyst included in devices following the desulfurizer. An absorbent that may be used for the desulfurizer and a hydrodesulfurization (HDS) process may also be used.

The reformer reforms hydrocarbons to produce hydrogen, which is then supplied to the fuel cell stack as a fuel. Any catalyst such as platinum, ruthenium, and nickel, among others, may be used for the reforming catalyst.

The high-temperature shift reaction device and the low-temperature shift reaction device remove carbon monoxide that poisons a catalyst layer of a fuel cell. Further, the high and low temperature shift reaction devices decrease the carbon monoxide concentration to less than 1%. The shift reaction catalyst may be charged in the shift reaction device, for example, as a fixed bed. The high-temperature shift reaction device and the low-temperature shift reaction device may be integrated in one shift reaction device.

By using the CO removal unit including the carbon monoxide removing catalyst system according to the aspects of the present invention, the CO concentration in the fuel treated in the high-temperature shift reaction device and the low-temperature shift reaction device is further decreased, and the final CO concentration is reduced to less than 10 ppm.

The CO removal unit can effectively remove carbon monoxide at an operating temperature less than 200° C., preferably in the range of 25 to 200° C., and more preferably in the range of 100 to 180° C.

The carbon monoxide removing catalyst system according to aspects of the current invention may have a double bed structure in which the PROX is disposed in one bed and the methanation catalyst is disposed in another bed. The PROX and the methanation catalysts may be arranged in the vertical direction through which the fuel gas flows in the CO removal unit. The PROX and the methanation catalysts are disposed so that the fuel gas flows first through the PROX catalyst, then through the methanation catalyst. As the PROX catalyst and the methanation catalyst operate at similar temperatures, the two catalysts can be charged in the same reactor in the CO removal unit to thereby obtain a simple system with a high efficiency.

The concentration of oxygen among gases introduced to the CO removal unit including the carbon monoxide removing catalyst system may be 0.5 to 1.5 times, and preferably 0.75 to 1.0 times, as much as that of carbon monoxide. When the oxygen concentration is less than the above described ranges, the activity of the PROX catalyst may be too low. When the oxygen concentration is greater than the above described range, the oxygen may be incompletely consumed in the PROX reaction, and thus the methanation catalyst may be oxidized.

According to aspects of the present invention, a fuel cell system including the fuel processor is prepared. The fuel cell according to aspects of the current invention includes a fuel processor, and a fuel cell stack. The fuel processor includes a desulfurizer, a reformer, a high-temperature shift reaction device, a low-temperature shift reaction device, and a carbon monoxide removal unit having a carbon monoxide removing catalyst system according to aspects of the present invention. The fuel cell stack may be formed by stacking or arranging a plurality of unit cells. Each of the unit cells may include a cathode, an anode, and an electrolyte membrane, and may further include a separator.

Hereinafter, the constitution and effects of aspects of the present invention will be described more specifically with reference to the following Examples and Comparative Examples. The following examples are for illustrative purposes only and are not intended to limit the scope of the invention.

Preparation of Methanation Catalyst

EXAMPLE 1

In order to prepare a non-precious metal methanation catalyst including cobalt particles and cobalt oxide particles, 80 g of cobalt nitrate ($Co(NO_3)_2 \cdot 6H_2O$) were mixed with 80 ml of deionized water and the mixture was stirred. 1 M NaOH was added dropwise to the cobalt nitrate solution to adjust the mixture to a pH of 8 to 9. The mixture was ripened at a temperature in the range of 70 to 80° C. for 1 hour, and the mixture was filtered and washed using deionized water to reach a pH of 7. Then, the mixture was dried in an oven at 110° C. for 10 hours, and reduced at 300° C. for 1 hour under an atmosphere of hydrogen gas to prepare crystalline, active catalyst metal particles and an oxide of the active catalyst metal.

EXAMPLE 2

In order to prepare a non-precious metal methanation catalyst including nickel particles and nickel oxide particles, 80 g of nickel nitrate ($Ni(NO_3)_2 \cdot 6H_2O$) were mixed with 80 ml of deionized water and the mixture was stirred. 1 M NaOH was added dropwise to the nickel nitrate solution to adjust the mixture to a pH of 8 to 9. The mixture was ripened at a temperature in the range of 70 to 80° C. for 1 hour, and the mixture was filtered and washed using deionized water to reach a pH of 7. Then, the mixture was dried in an oven at 110° C. for 10 hours, and reduced at 300° C. for 1 hour under an atmosphere of hydrogen gas to prepare crystalline active catalyst metal particles and an oxide of the active catalyst metal.

EXAMPLE 3

In order to prepare a non-precious metal methanation catalyst including cobalt and nickel particles, and oxide particles thereof, 40 g of each of the cobalt nitrate ($Co(NO_3)_2 \cdot 6H_2O$) and nickel nitrate ($Ni(NO_3)_2 \cdot 6H_2O$) were mixed with 80 ml of deionized water and the mixture was stirred. 1 M NaOH was added dropwise to the mixture to adjust the mixture to a pH of 8 to 9. The mixture was ripened at a temperature in the range of 70 to 80° C. for 1 hour, and the mixture was filtered and washed using deionized water to reach a pH of 7. Then, the mixture was dried in an oven at 110° C. for 10 hours, and reduced at 300° C. for 1 hour under an atmosphere of hydrogen gas to prepare crystalline active catalyst metal particles and oxides of the active catalyst metals.

EXAMPLE 4

In order to prepare a non-precious metal methanation catalyst including cobalt particles and cobalt oxide particles, 80 g of cobalt nitrate ($Co(NO_3)_2 \cdot 6H_2O$) were mixed with 80 ml of deionized water and the mixture was stirred. 1 M NaOH was added dropwise to the cobalt nitrate solution to adjust the mixture to a pH of 8 to 9. The mixture was ripened at a temperature in the range of 70 to 80° C. for 1 hour, and the mixture was filtered and washed using deionized water to reach a pH of 7. Then, the mixture was dried in an oven at 110° C. for 10 hours and used without reducing the dried mixture under an atmosphere of hydrogen.

A CO removal unit was formed in which $CuO$—$CeO_2$ used for a PROX catalyst. Each of the metal precursors (38 g of $Cu(NO_3)_2 \cdot xH_2O$ and 138 g of $Ce(NO_3)_3 \cdot 6H_2O$) was mixed with 170 ml of deionized water and the mixture was stirred. 1 M NaOH was added dropwise to the mixture to adjust the mixture to a pH of 8 to 9. The mixture was ripened at a temperature in the range of 70 to 80° C. for 1 hour, and the mixture was filtered and washed using deionized water to reach pH 7. Then, the mixture was dried in an oven at 110° C. for 10 hours, and oxidized at 700° C. for 1 hour using air to prepare the oxide.

2 ml of the PROX catalyst and 8 ml of the methanation catalyst were sequentially charged in the CO removal unit from an inlet such that the fuel gas would travel first through the PROX catalyst then the methanation catalyst. Fuel gases (0.9% CO, 0.9% $O_2$, 64.6% $H_2$, 17.4% $CO_2$, 13.0% $H_2O$, and the balance $N_2$) treated in a shift reaction device were passed through the CO removal unit at a space velocity (ml of gas/hr/ml of catalyst) of 5000 $h^{-1}$ while the temperature increased by 1° C. per minute to thereby remove carbon monoxide. The activity of the catalyst was evaluated after reduction performed at 300° C. for 1 hour using hydrogen.

COMPARATIVE EXAMPLE 1

In order to prepare a precious metal methanation catalyst including ruthenium particles loaded on a $TiO_2$ support, 10.3 g of Ru(III) nitrosyl nitrate ($Ru(NO)(NO_3)_x(OH)_y$, x+y=3) were mixed with 50 ml of deionized water, and 5 g of $TiO_2$ (P25) support were added thereto. The mixture was spun in a spin vacuum evaporator at a temperature in the range of 60 to 70° C. for 6 hours. Then, the mixture was vacuum treated to remove a dispersion medium. The mixture was dried at 110° C. for 10 hours and reduced at 300° C. for 1 hour under an atmosphere of hydrogen to prepare a Ru catalyst loaded on the support.

COMPARATIVE EXAMPLE 2

A precious metal methanation catalyst of $Ru/g\text{-}Al_2O_3$ (5 wt % of Ru) was obtained from Aldrich and compared to the other methanation catalysts.

COMPARATIVE EXAMPLE 3

In order to prepare a 1 wt % of Pt—Ni/YSZ supported catalyst, 0.21 g of $Pt(NH_3)_4(NO_3)_2$ and 1.55 g of $Ni(NO_3)_2 \cdot 6H_2O$ were dissolved in 50 ml of deionized water, and 10 g of a YSZ support (available from Aldrich) were added thereto. The mixture was spun in a spin vacuum evaporator at a temperature in the range of 60 to 70° C. for 6 hours. Then, the mixture was vacuum treated to remove a dispersion medium. The mixture was dried at 110° C. for 10 hours and reduced at 300° C. for 1 hour under an atmosphere of hydrogen to prepare the Pt—Ni catalyst loaded on a support.

COMPARATIVE EXAMPLE 4

In order to prepare a 1 wt % of Pt—Co/YSZ supported catalyst, 0.21 g of $Pt(NH_3)_4(NO_3)_2$ and 1.55 g of $Co(NO_3)_2 \cdot 6H_2O$ were dissolved in 50 ml of deionized water, and 10 g of a YSZ support (available from Aldrich) were added thereto. The mixture was spun in a spin vacuum evaporator at a temperature in the range of 60 to 70° C. for 6 hours. Then, the mixture was vacuum treated to remove a dispersion medium. The mixture was dried at 110° C. for 10 hours and reduced at 300° C. for 1 hour under an atmosphere of hydrogen to prepare a Pt—Co catalyst loaded on a support.

COMPARATIVE EXAMPLE 5

In order to prepare a 10 wt % of Ni/YSZ supported catalyst, 2.84 g of $Ni(NO_3)_2 \cdot 6H_2O$ were dissolved in 50 ml of deionized water, and 5 g of a YSZ support (available from Aldrich) were added thereto. The mixture was spun in a spin vacuum evaporator at a temperature in the range of 60 to 70° C. for 6 hours. Then, the mixture was vacuum treated to remove a dispersion medium. The mixture was dried at 110° C. for 10 hours and reduced at 300° C. for 1 hour under an atmosphere of hydrogen to prepare the Ni catalyst loaded on a support.

COMPARATIVE EXAMPLE 6

In order to prepare a 10 wt % of Co/YSZ supported catalyst, 2.83 g of $Co(NO_3)_2 \cdot 6H_2O$ were dissolved in 50 ml of deionized water, and 5 g of a support YSZ (available from Aldrich) were added thereto. The mixture was spun in a spin vacuum evaporator at a temperature in the range of 60 to 70° C. for 6 hours. Then, the mixture was vacuum treated to remove a dispersion medium. The mixture was dried at 110° C. for 10 hours and reduced at 3000C for 1 hour under an atmosphere of hydrogen to prepare the Co catalyst loaded on a support.

COMPARATIVE EXAMPLE 7

A CO removal unit to remove carbon monoxide was prepared in the same manner as in Example 4, except that 10 ml of $CuO$—$CeO_2$ were charged in the CO removal unit instead of including 8 ml of the methanation catalyst according to aspects of the present invention. The $CuO$—$CeO_2$ was prepared similar to that in Example 4. Fuel gases (0.9% CO, 0.9% $O_2$, 64.6% $H_2$, 17.4% $CO_2$, 13.0% $H_2O$, and the balance $N_2$) treated in a shift reaction device were passed through the CO removal unit at a space velocity (ml of gas/hr/ml of catalyst) of 5000 $h^{-1}$ while the temperature increased by 1° C. per minute to remove carbon monoxide.

Evaluation of Catalyst Activity

Methanation was performed using the methanation catalyst prepared according to Example 1 and Comparative Examples 1 through 6. The concentrations of carbon monoxide and methane according to the temperature were respectively shown in FIGS. 5 and 6. Each of the methanation catalysts were pretreated by reduction at 573K for 1 hour under an atmosphere of hydrogen. The concentrations of reactants used in methanation were 1% CO, 50% $H_2$, 20% $CO_2$, and the balance He.

Figure 5:
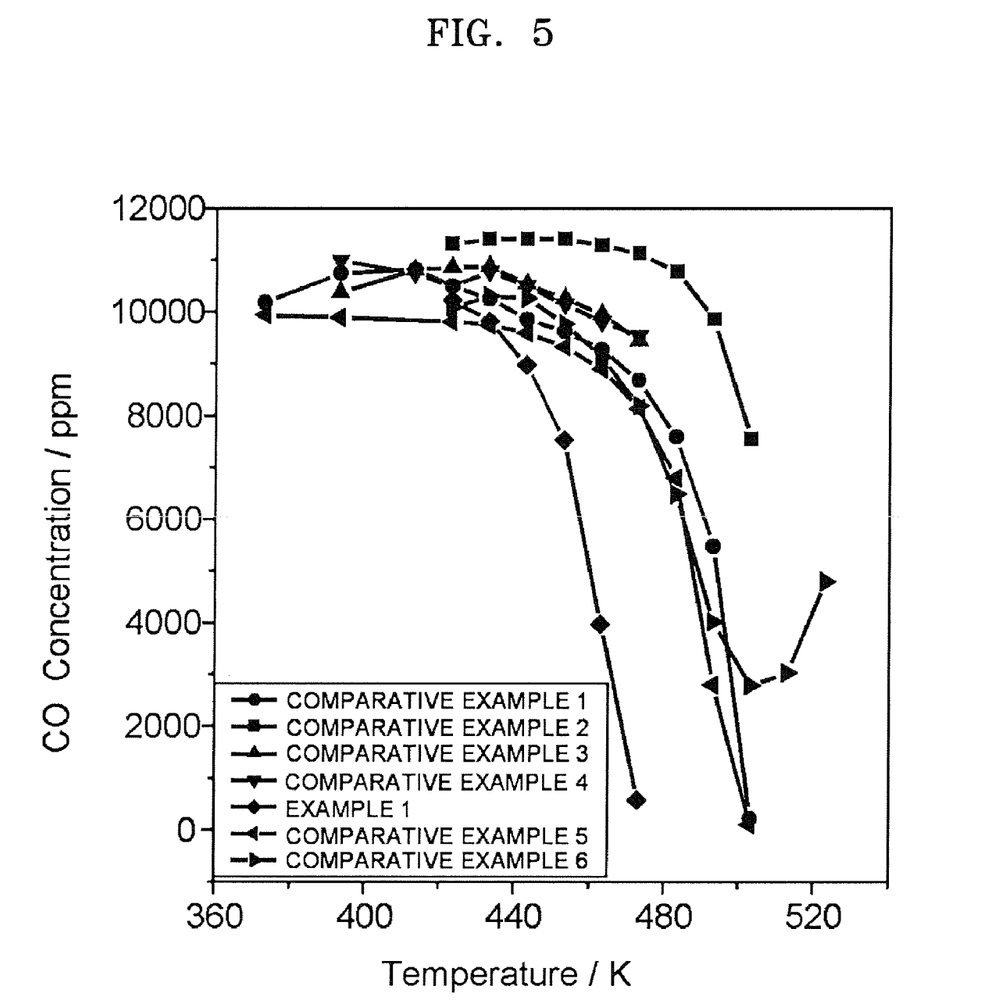
FIG. 5 is a graph illustrating the concentrations of carbon monoxide according to the temperature when methanation is performed using a methanation catalyst prepared according to Comparative Examples 1 through 6.
Figure 6:
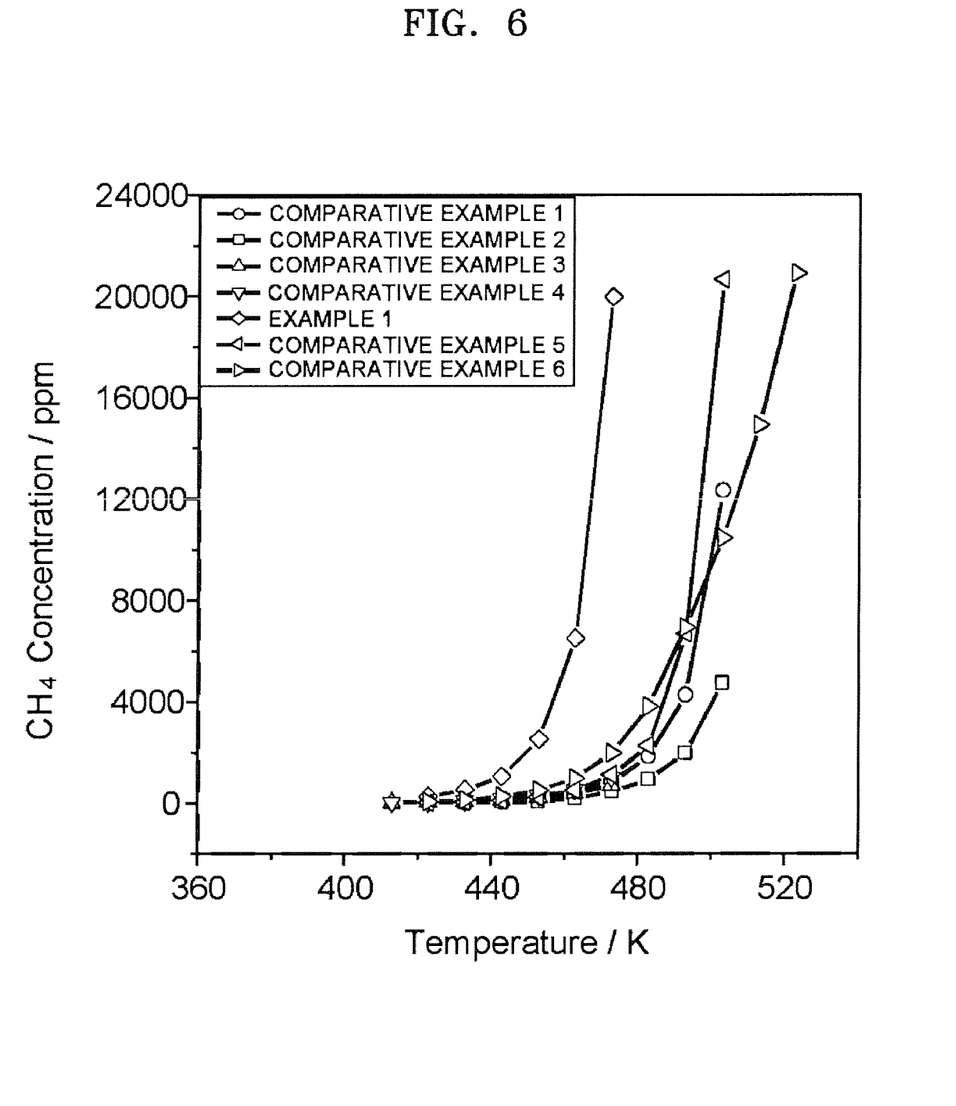
FIG. 6 is a graph illustrating the concentrations of methane according to the temperature when methanation is performed using a methanation catalyst prepared according to Comparative Examples 1 through 6.

As illustrated in FIGS. 5 and 6, when the methanation catalyst of Example 1 was used, lower CO concentration at the same temperatures and higher $CH_4$ concentration at the same temperatures were observed as compared to the methanation catalysts of Comparative Examples 1 through 6.

Figure 7:
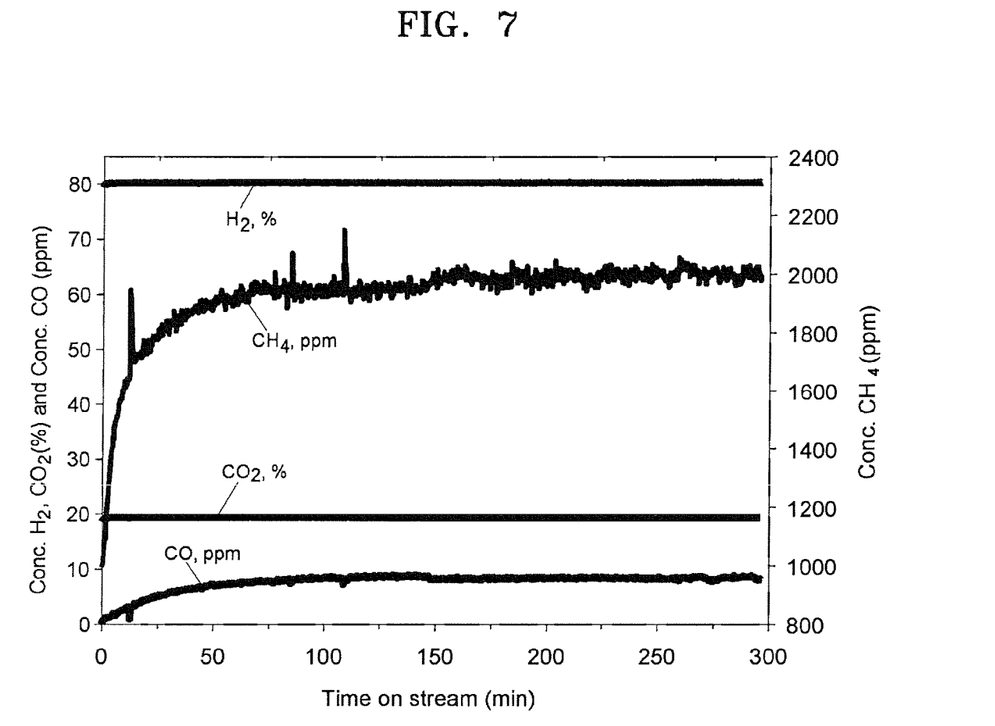
FIG. 7 is a graph illustrating the concentrations of each of the reactants according to time when a catalyst prepared according to Example 1 is used.

FIG. 7 is a graph illustrating the concentrations of each of the reactants according to time when a catalyst prepared according to Example 1 is used. The initial concentrations of CO, $H_2$, and $CO_2$, exclusive of water were respectively 0.2%, 80% and 19.8%, the amount of water was 20% based on the total amount of the reactants, the gas hourly space velocity (GHSV) was 6,000 ml/g/h, and the temperature was 140° C.

As illustrated in FIG. 7, when the methanation catalyst of Example 1 was used, the concentration of the reactants were constant with time and carbon monoxide was effectively removed at a low operating temperature of 200° C. or less.

Figure 8:
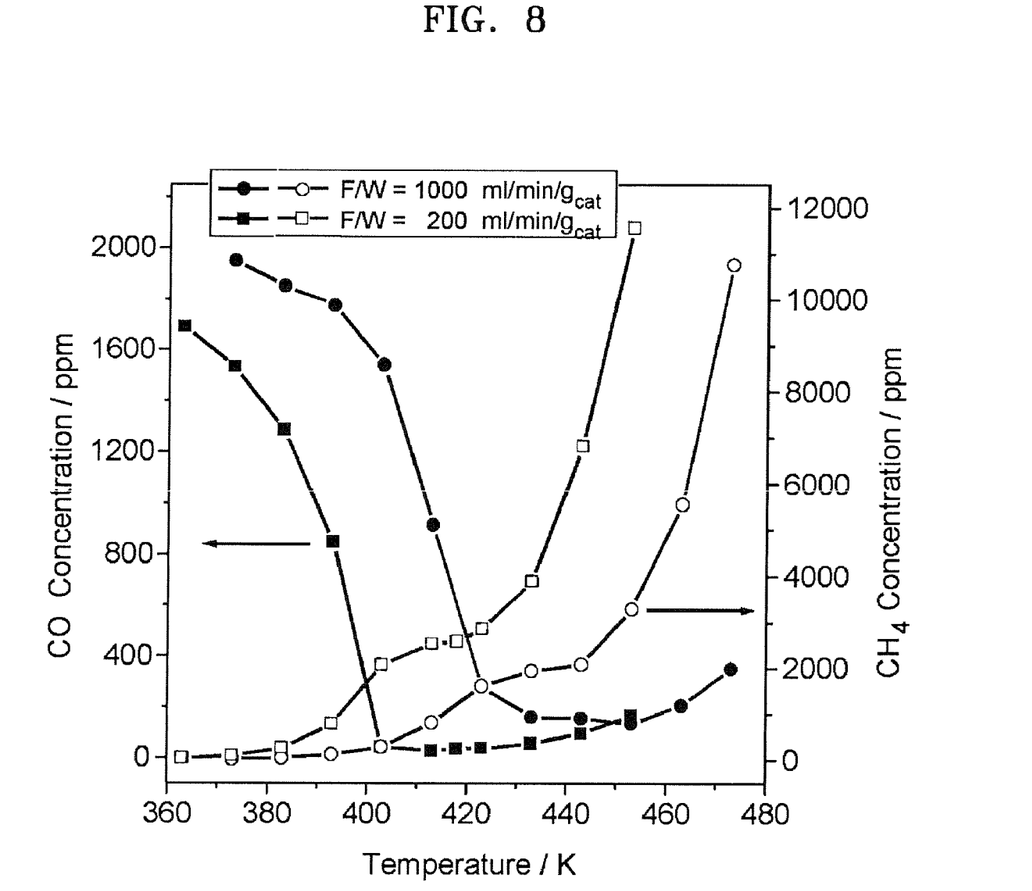
FIG. 8 is a graph illustrating the concentrations of carbon monoxide and methane according to the temperature when space velocity of the reactants is varied using a catalyst prepared according to Example 1.

Further, FIG. 8 is a graph illustrating the concentrations of carbon monoxide and methane according to the temperature when space velocity of the reactants is varied and using a catalyst prepared according to Example 1. The initial concentrations of reactant gases were respectively 0.2% CO, 70% $H_2$, 20% $CO_2$, 2% $H_2O$, and the balance He.

As illustrated in FIG. 8, the CO concentration decreased and the $CH_4$ concentration increased at lower temperatures when the space velocity, which is defined as the volume of gas per 1 g of a catalyst per minute, of the reactants decreased. Specifically, when the space velocity was 200 ml/min/$g_{cat}$, the CO concentration substantially decreased between 360 and 400 K (87 and 127° C.), and the $CH_4$ concentration increased between 400 and 450 K (127 and 177° C.). Thus, the efficiency of removing carbon monoxide increases as the space velocity decreases.

Figure 10:
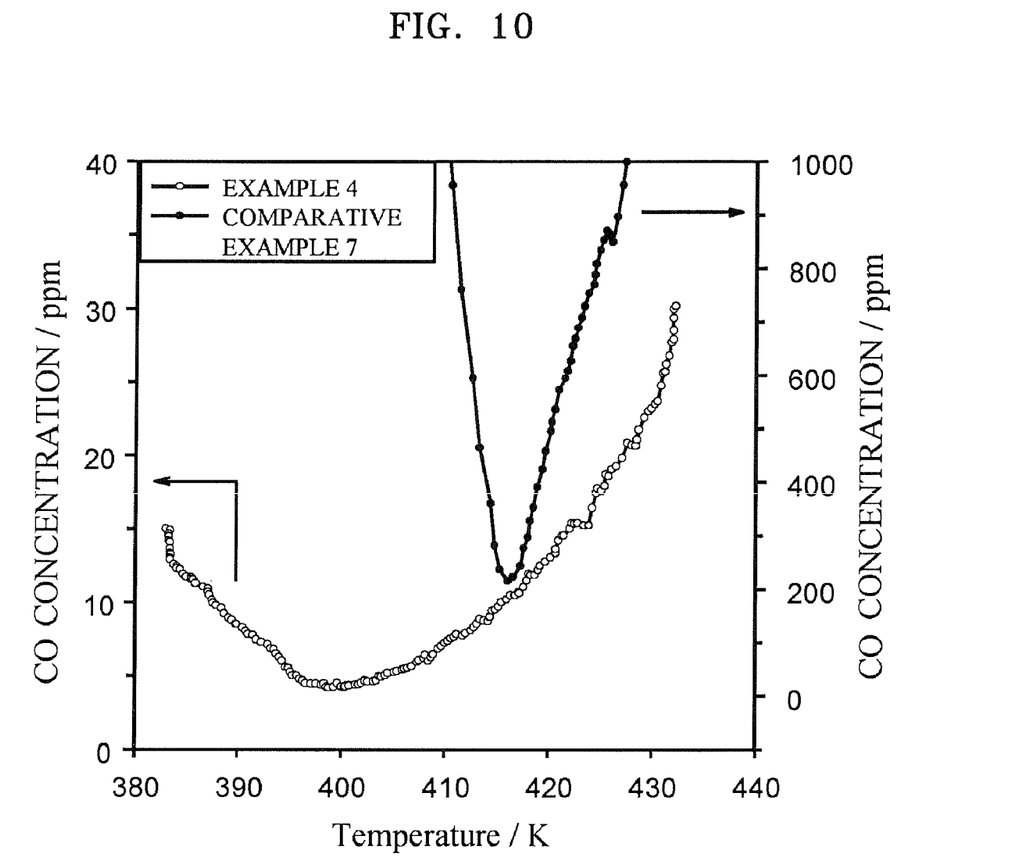
FIG. 10 is a graph illustrating the concentration of carbon monoxide according to the temperature in a CO removal unit prepared according to Example 4 and Comparative Example 7.

FIG. 10 is a graph illustrating the concentration of carbon monoxide according to the temperature in a CO removal unit prepared according to Example 4 and Comparative Example 7. As illustrated in FIG. 10, when the catalyst system of Example 4 was used, the carbon monoxide level was maintained less than 10 ppm at an effective operating temperature in the range of about 115 to 145° C.

That is, when the methanation catalyst is cobalt metal particles and cobalt oxide particles, the concentration of carbon monoxide remarkably decreased at CO concentration of 1% or less at an operating temperature in the range of 100 to 180° C., which is far less than 220 to 300° C., the operating temperature of conventional methanation catalysts. Accordingly, the methanation catalyst according to aspects of the present invention can decrease a methanation of carbon dioxide and a reverse water gas shift reaction of carbon dioxide, which are side reactions of the methanation, due to the low operating temperature of the methanation reaction. In particular, the methanation catalyst according to aspects of the present invention can selectively remove carbon monoxide without decreasing the concentration of hydrogen through the methanation of the about 20% $CO_2$ and the reverse water gas shift reaction. Further, the methanation catalyst can be operated with a PROX catalyst in the same reactor.

Evaluation of Catalyst Characteristics

The amount of consumed hydrogen according to the temperature was measured according to post-treatment conditions using the methanation catalyst prepared in Example 1 to measure the amount of the metal oxide in the methanation catalyst. The methanation catalysts prepared in Example 1 were treated using air at 100° C. (Example 1—Air—100° C.) and 300° C. for 1 hour (Example 1—Air—300° C.), an treated under a hydrogen atmosphere at 300° C. for 1 hour (Example 1—$H_2$—300° C.). Hydrogen was flowed through each of the treated catalysts while the temperature increased from room temperature to 600° C. so as to measure the amount of consumed hydrogen.

Figure 9:
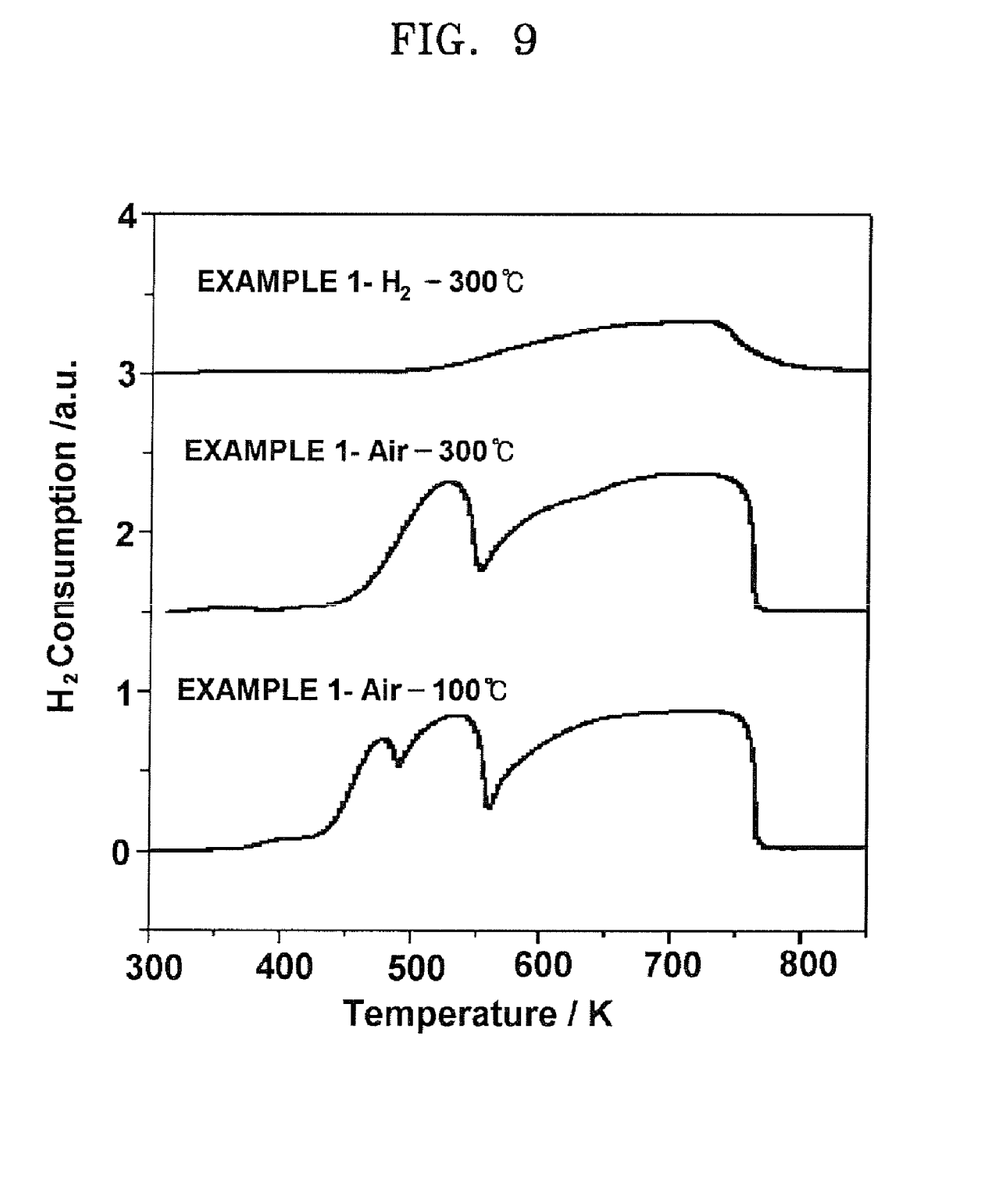
FIG. 9 is a graph illustrating the amount of consumed hydrogen according to the temperature when treatment conditions for a catalyst prepared according to Example 1 vary.

FIG. 9 is a graph illustrating the amount of consumed hydrogen according to the temperature for the different post-treatment conditions for a catalyst prepared according to Example 1. Referring to FIG. 9, the methanation catalyst treated using air at 100° C. showed 13.07 mmol/$g_{cat}$ of consumed hydrogen as a result of the flowing hydrogen while the temperature increased, the methanation catalyst treated using air at 300° C. showed 11.59 mmol/$g_{cat}$ of consumed hydrogen as a result of the flowing hydrogen while the temperature increased, and the methanation catalyst treated under hydrogen atmosphere at 300° C. showed 3.21 mmol/$g_{cat}$ of consumed hydrogen as a result of the flowing hydrogen while the temperature increased.

Thus, in the methanation catalyst treated under hydrogen atmosphere at 300° C., almost all of the metal was reduced, and 3.21 mmol/$g_{cat}$ of hydrogen was consumed to reduce the remaining metal oxide which was not reduced in the methanation catalyst. On the other hand, in the methanation catalysts treated using air, almost all of the metal was oxidized, and thus 11.59 mmol/$g_{cat}$ of hydrogen was consumed to reduce the metal oxide in the methanation catalysts treated using air at 300° C. And, 13.07 mmol/$g_{cat}$ of hydrogen was consumed to reduce the metal oxide in the methanation catalysts treated using air at 100° C. Therefore, the non-precious methanation catalyst according to aspects of the present invention includes active catalyst metal particles and the metal oxide particles, and the treatment of the methanation catalyst under hydrogen at 300° C. for 1 hr produces a methanation catalyst with more of the metal catalyst than the treatment of the methanation catalyst under air at 100 or 300° C. for 1 hr. Particularly, the mol ratio of the metal oxide particles to the metal particles of the active catalyst is in the range of 0 to 1, inclusive.

The methanation catalyst according to aspects of the present invention has high selectivity for the methanation of carbon monoxide as opposed to the reverse water gas shift reaction of carbon dioxide or the methanation of carbon dioxide, which are side reactions of the methanation, maintains high concentration of the generated hydrogen as only small amounts of hydrogen and carbon dioxide are consumed, and effectively removes carbon monoxide at a low operating temperature of 200° C. or less.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A methanation catalyst, comprising:
   catalytically active, non-precious metal particles that are catalytically active with regard to a methanation reaction of carbon monoxide, wherein the catalytically active, non-precious metal particles comprise cobalt (Co), nickel (Ni), or a mixture of cobalt and nickel; and
   metal oxide particles of the non-precious metals, wherein the metal oxide particles comprise cobalt oxide ($CoO_x$), nickel oxide ($NiO_x$), or a mixture of cobalt oxide and nickel oxide, where x is an integer from 1 to 2.

2. The methanation catalyst of claim 1, wherein the mol ratio of the metal oxide particles to the metal particles is in the range of 0 to 1.

3. The methanation catalyst of claim 1, wherein the mol ratio of the metal oxide particles to the metal particles is in the range of 0 to 0.

4. The methanation catalyst of claim 1, wherein the catalytically active, non-precious metal particles comprise the mixture of cobalt and nickel, and the metal oxide particles comprise the mixture of cobalt oxide and nickel oxide, and
wherein the mixture of cobalt and nickel comprises 10 to 90 parts by weight of nickel and nickel oxide based on 100 parts by weight of cobalt and cobalt oxide.

5. The methanation catalyst of claim 1, wherein the catalytically active, non-precious metal particles have an average particle size of 2 to 500 nm.

6. The methanation catalyst of claim 1, wherein an operating temperature of the methanation catalyst is in the range of 100 to 180° C. at a carbon monoxide concentration of less than 1%.

7. The methanation catalyst of claim 1, wherein the methanation catalyst is prepared by precipitation, hydrothermal synthesis, or a sol-gel method.

8. The methanation catalyst of claim 7, wherein the methanation catalyst is reduced by a vapor phase reduction or a liquid phase reduction.

9. The methanation catalyst of claim 7, wherein the methanation catalyst is post-treated with heat treatment under a hydrogen atmosphere at a temperature in the range of 200 to 500° C. for 1 to 12 hours.

10. The methanation catalyst of claim 1, wherein the catalytically active, non-precious metal particles and the metal oxide particles form a non-supported methanation catalyst.

11. A carbon monoxide removing catalyst system, comprising:
the methanation catalyst according to claim 1.

12. The carbon monoxide removing catalyst system of claim 11, wherein the methanation catalyst and a PROX catalyst are integrated.

13. The carbon monoxide removing catalyst system of claim 12, wherein the PROX catalyst is selected from the group consisting of $CuO$—$CeO_2$, Pt—Ni/γ-$Al_2O_3$, Pt—Co/γ-$Al_2O_3$, and Pt—Co/YSZ.

14. The carbon monoxide removing catalyst system of claim 12, wherein the amount of the PROX catalyst is in the range of 5 to 50% by volume.

15. The carbon monoxide removing catalyst system of claim 12, wherein the carbon monoxide is removed at a temperature of 200° C. or lower.

16. The carbon monoxide removing catalyst system of claim 12, wherein the carbon monoxide is removed at a temperature in the range of 25 to 200° C.

17. The carbon monoxide removing catalyst system of claim 12, wherein the carbon monoxide is removed at a temperature in the range of 100 to 180° C.

18. A fuel processor, comprising:
a desulfurizer;
a reformer;
a shift reaction device;
a CO removal unit; and
the carbon monoxide removing catalyst system according to claim 11.

19. The fuel processor of claim 18, wherein the carbon monoxide removing catalyst system is disposed in the CO removal unit.

20. The fuel processor of claim 18, wherein a concentration of oxygen among gases introduced to the CO removal unit is 0.5 to 1.5 times as much as a concentration of carbon monoxide.

21. The fuel processor of claim 20, wherein the concentration of oxygen among gases introduced to the CO removal unit is 0.75 to 1.0 times as much as the concentration of carbon monoxide.

22. The fuel processor of claim 18, wherein the space velocity of a fuel supplied to the carbon monoxide removing catalyst system is less than 1000 ml/min/$g_{cat}$.

23. The fuel processor of claim 18, wherein the space velocity of a fuel supplied to the carbon monoxide removing catalyst system is less than 200 ml/min/$g_{cat}$.

24. A fuel cell, comprising:
the fuel processor of claim 18.

25. A fuel cell, comprising:
a fuel cell stack to produce electric energy from an enriched hydrogen fuel and oxygen; and
a carbon monoxide removal unit to contain a PROX catalyst and a methanation catalyst to produce the enriched hydrogen fuel,
wherein the methanation catalyst comprises:
catalytically active, non-precious metal particles that are catalytically active with regard to a methanation reaction of carbon monoxide, wherein the catalytically active, non-precious metal particles comprise cobalt (Co), nickel (Ni), or a mixture of cobalt and nickel; and
metal oxide particles of the non-precious metals, wherein the metal oxide particles comprise cobalt oxide ($CoO_x$), nickel oxide ($NiO_x$), or a mixture of cobalt oxide and nickel oxide, where x is an integer from 1 to 2.

26. The fuel cell of claim 25, wherein the carbon monoxide removal unit further comprises a double bed structure in which the PROX catalyst is disposed in a first bed, and the methanation catalyst is disposed in a second bed.

27. The fuel cell of claim 26, wherein the double bed structure is arranged so that an un-enriched hydrogen fuel flows through the first bed then the second bed.

28. The fuel cell of claim 26, wherein the double bed structure is maintained at a temperature less than 200° C.

29. The fuel cell of claim 28, wherein the temperature is maintained between 100 and 180° C.

30. A methanation catalyst, comprising:
a non-precious metal that is catalytically active with regard to a methanation reaction of carbon monoxide at a temperature of less than 200° C., wherein the non-precious metal comprises cobalt (Co), nickel (Ni), or a mixture of cobalt and nickel, and a metal oxide of the non-precious metal, wherein the metal oxide comprises cobalt oxide ($CoO_x$), nickel oxide ($NiO_x$), or a mixture of cobalt oxide and nickel oxide, where x is an integer from 1 to 2.

31. The methanation catalyst of claim 30, wherein the temperature is between about 100 and 180° C.

32. The methanation catalyst of claim 30, wherein the metal selects the methanation reaction of carbon monoxide to a reverse water gas shift reaction and a methanation of carbon dioxide.

33. A catalyst that oxidizes carbon monoxide, the catalyst comprising platinum (Pt) and cobalt (Co), wherein the platinum and the cobalt are mixed with a YSZ (Yttria Stabilized Zirconia) support.

* * * * *

UNITED STATES PATENT AND TRADEMARK OFFICE
CERTIFICATE OF CORRECTION

PATENT NO. : 8,067,332 B2
APPLICATION NO. : 11/743763
DATED : November 29, 2011
INVENTOR(S) : Hyun-Chul Lee et al.

It is certified that error appears in the above-identified patent and that said Letters Patent is hereby corrected as shown below:

Column 13, Claim 3, line 8.    Delete "0 to 0."

Insert -- 0 to 0.4. --

Signed and Sealed this
Twenty-seventh Day of November, 2012

David J. Kappos
*Director of the United States Patent and Trademark Office*